United States Patent
Kim et al.

(10) Patent No.: US 9,316,774 B2
(45) Date of Patent: Apr. 19, 2016

(54) LIQUID CRYSTAL DISPLAY DEVICE HAVING HEAT RADIATION SHEET

(71) Applicant: LG Display Co., Ltd., Seoul (KR)

(72) Inventors: WonJong Kim, Gyeongsangbuk-do (KR); WonTae Kim, Daegu (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/526,794

(22) Filed: Oct. 29, 2014

(65) Prior Publication Data

US 2015/0116633 A1    Apr. 30, 2015

(30) Foreign Application Priority Data

Oct. 29, 2013    (KR) .................. 10-2013-0129524

(51) Int. Cl.
*G02B 6/00* (2006.01)
*F21V 8/00* (2006.01)
*G02F 1/1335* (2006.01)

(52) U.S. Cl.
CPC .............. *G02B 6/00* (2013.01); *G02B 6/0085* (2013.01); *G02F 1/133615* (2013.01); *G02F 2001/133628* (2013.01)

(58) Field of Classification Search
CPC .............. G02F 1/133615; G02F 2001/133628
See application file for complete search history.

(56) References Cited

U.S. PATENT DOCUMENTS

| | | | | |
|---|---|---|---|---|
| 2012/0300137 A1* | 11/2012 | Kasai | ................... | G02B 6/0085 348/739 |
| 2013/0094245 A1* | 4/2013 | Kanda et al. | ......... | G02B 6/0085 362/611 |
| 2013/0182412 A1* | 7/2013 | Choi | ................... | G02B 6/0085 362/97.1 |

FOREIGN PATENT DOCUMENTS

| | | |
|---|---|---|
| JP | 2004-333996 A | 11/2004 |
| JP | 2009-210731 A | 9/2009 |
| JP | 2012-178368 A | 9/2012 |
| JP | 2013-206574 A | 10/2013 |
| KR | 10-0827377 B | 5/2008 |
| KR | 10-2011-0099449 A | 9/2011 |
| KR | 10-2012-0067088 A | 6/2012 |
| KR | 10-2012-0067205 A | 6/2012 |
| KR | 10-2012-0130034 A | 11/2012 |
| KR | 10-2013-0027874 A | 3/2013 |

OTHER PUBLICATIONS

Notice of Allowance dated Mar. 23, 2015 for corresponding Korean Patent Application No. 10-2013-0129524.
Korean Office Action dated Sep. 25, 2014 for corresponding application No. KR10-2013-0129524.

* cited by examiner

*Primary Examiner* — Anne Hines
(74) *Attorney, Agent, or Firm* — Morgan, Lewis & Bockius LLP (57) ABSTRACT

A display device having a heat radiation sheet to prevent temperature rise is provided. The display device includes a liquid crystal display (LCD) panel; a light emitting diode (LED) substrate on which a plurality of LEDs are mounted; a light guiding plate disposed below the LED substrate and configured to guide light emitted from the LEDs to the LED substrate; and a heat radiation sheet disposed below the light guiding plate and the LED substrate and configured to discharge heat generated from the LEDs.

19 Claims, 4 Drawing Sheets

LIQUID CRYSTAL DISPLAY DEVICE HAVING HEAT RADIATION SHEET

CROSS-REFERENCE TO RELATED APPLICATION

Pursuant to 35 U.S.C. §119(a), this application claims the benefit of earlier filing date and right of priority to Korean Application No. 10-2013-0129524, filed on Oct. 29, 2013, the contents of which are incorporated by reference herein in its entirety.

BACKGROUND OF THE INVENTION

1. Field of the Invention

The present disclosure relates to a display device, and particularly, to a display device having a heat radiation sheet capable of easily radiating heat in a small-sized liquid crystal display device (LCD).

2. Discussion of the Related Art

Recently, a flat panel display device such as a liquid crystal display device (LCD) is used as a display device not only in various portable electronic devices such as mobile phones, notebook computers and tablet computers, but also in large-sized electronic devices such as televisions.

Such an LCD is a transmittance-type display device, which displays an image by adjusting light transmittance of liquid crystal having dielectric anisotropy using an electric field. To this end, an LCD includes a backlight which is a light source that generates light penetrating a liquid crystal layer for an image display.

In general, the backlight is classified into two types, a side type backlight in which a lamp is disposed at a side surface of a liquid crystal panel and provides light to the liquid crystal layer, and a downright type backlight in which a lamp directly provides light from a lower side of a liquid crystal panel.

The side type backlight is disposed at a side surface of the liquid crystal panel and may provide light to a liquid crystal layer through a reflective plate and a light guiding plate. Since it is possible to obtain a thin display device, such a side type backlight is mainly used in a notebook computer which requires a thin display device. However, since a lamp that generates light is disposed at a side surface of the liquid crystal panel in the side type backlight, it is difficult for the side type backlight to be applied to large-sized electronic devices and also it is difficult to obtain high brightness because light is supplied via the light guiding plate. Thus, such a side type backlight is not appropriate to be used in a large-sized LCD TV which has recently been highlighted.

The downright type backlight is being applied not only to a large-sized liquid crystal panel as light generated from a lamp is directly supplied to a liquid crystal layer, but to a liquid crystal panel for manufacturing an LCD TV owing to its high brightness.

Meanwhile, as a lamp for backlight, a light source such as a light emitting diode (LED) which is one of self-luminous devices, is mainly used rather than a fluorescent lamp. Since such an LED emits monochromatic light, i.e., R, G and B, there are advantages in that color reproducibility is good when the LED is applied to a backlight and a driving power can be reduced.

Figure 1:
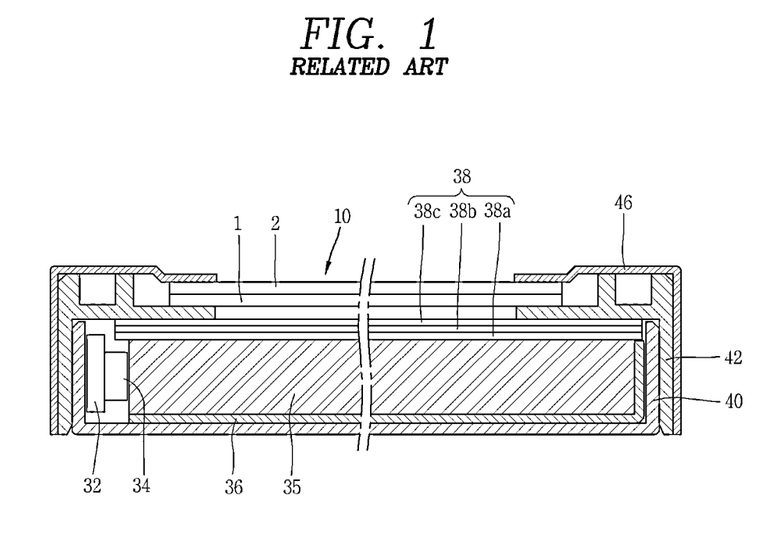
FIG. 1 is a cross-sectional view illustrating a structure of a related art large-sized liquid crystal display (LCD)

FIG. 1 is a cross-sectional view illustrating a structure of a liquid crystal display device provided with a backlight having an LED according to the related art.

As shown in FIG. 1, an LCD includes a liquid crystal panel 10 which includes a first substrate 1, a second substrate 2, and a liquid crystal layer (not shown) disposed between the first substrate 1 and the second substrate 2, and is configured to implement an image as a signal is applied thereto from outside, an LED substrate 32 disposed at a lower side surface of the liquid crystal panel 10 and having thereon a plurality of LEDs 34 that emit light, a light guiding plate 35 disposed at a lower side of the liquid crystal panel 10 and configured to guide light emitted from the LEDs 34 and provide the light to the liquid crystal panel 10, an optical sheet 38 disposed between the liquid crystal panel 10 and the light guiding plate 35 and including a diffusion sheet 38a and prism sheets 38b and 38c that diffuse and condense light guided from the light guiding plate 35 and provided to the liquid crystal panel 10, a reflective plate 36 disposed below the light guiding plate 35 and configured to reflect light guided to a lower side of the light guiding plate 35, a lower cover 40 in which the reflective plate 36, the light guiding plate 35, the optical sheet 38, and the LED substrate 32 are accommodated, a guide panel 42 coupled with the lower cover 40 and in which the reflective plate 36, the light guiding plate 35, the optical sheet 38, and the LED substrate 32 are mounted and on which the liquid crystal panel 10 is positioned, and an upper cover 46 coupled with the guide panel 42 and configured to mount the liquid crystal panel 10 thereunder.

The first substrate 1 of the liquid crystal panel 10 is an array substrate on which a thin film transistor is formed. On the first substrate 1, not only the thin film transistor, but various wirings and pixel electrodes are formed. The second substrate 2 is a color filter substrate and a color filter and a black matrix are formed thereon.

The lower cover 40 is configured to assemble a backlight including the reflective plate 36, the light guiding plate 35, the optical sheet 38, and the LEDs 34, and its wall is extended upwardly from a bottom so that parts of the backlight may be positioned for assembly. The upper cover 46 is coupled with the guide panel 42 and the lower cover 40 in order to mount the liquid crystal panel 10 and the backlight therein.

In such a related art liquid crystal display device, the LED substrate 32 is disposed on at least one side surface of the light guiding plate 35 and a plurality of LEDs 34 are disposed on the LED substrate 32 so that light emitted from the LEDs 34 is made to be incident to a side surface, that is, a light incident surface of the light guiding plate 35 and then provided to the liquid crystal panel 10.

Meanwhile, an LED is known as a display device that generates more heat than a fluorescent lamp. Thus, when LEDs 34 are used as a light source of a backlight, a temperature of a liquid crystal display device rises, compared with a case where a fluorescent lamp is used, so that a lifespan of the LEDs 34 is decreased, the light guiding plate and the optical sheet are deteriorated, or a liquid crystal layer of the liquid crystal panel 10 is deteriorated, resulting in faulty products. To this end, when the LEDs 34 are used as a light source of the backlight, it is necessary to prevent temperature rise in a liquid crystal display device by promptly discharging heat generated from the LEDs 34 to outside.

In the related art liquid crystal display device as shown in FIG. 1, the LED substrate 32 includes a metal plate with a set area, and a flexible printed circuit (FPC) (not shown) made of a soft film is attached to an end of the LED substrate 32 which includes a metal so that the LEDs 34 are electrically connected to an external power source. Further, the lower cover 40, the guide panel 42, and the upper cover 46 include a metal having high heat conductivity.

Thus, in such a related art liquid crystal display device, heat generated from the LEDs 34 is discharged through the LED substrate 32, the lower cover 40, the guide panel 42, and the upper cover 46 so that temperature rise in a liquid crystal device can be prevented.

However, the liquid crystal display device having such structure shown in FIG. 1 is a large-sized one which is mainly used in an electronic device such as a TV or a notebook computer, and a small-sized display device used in a portable device such as a mobile phone has a different structure from that of the display device of FIG. 1.

Figure 2:
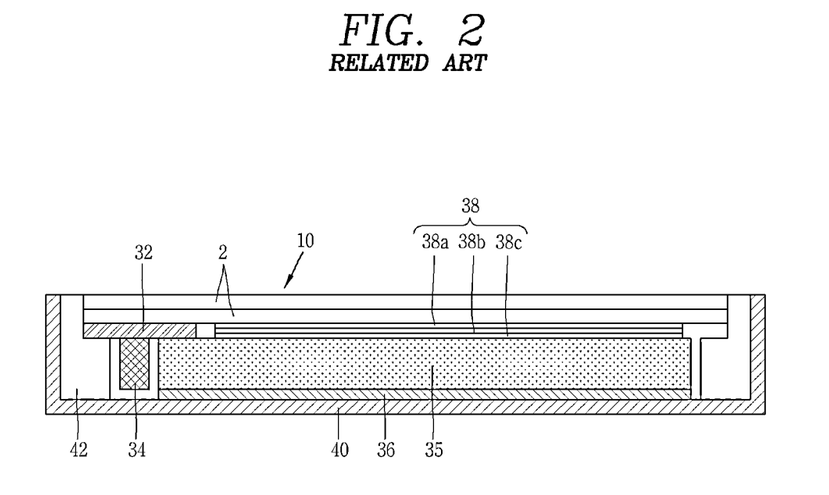
FIG. 2 is a cross-sectional view illustrating a structure of a related art small-sized liquid crystal display (LCD)

FIG. 2 is a cross-sectional view illustrating a small-sized liquid crystal display device in accordance with the related art. The structure of the small-sized liquid crystal display device and that of the large-sized liquid crystal display device of FIG. 2 are similar to each other, but there is a difference in an assembling process of the LEDs 34 and the LED substrate 32. Thus descriptions on the same elements having the same structure will be omitted for clarity purpose.

Here, in the liquid crystal display devices of FIG. 1 and FIG. 2, shapes of the guide panels are different from each other, but may be manufactured in various forms and shapes depending on a size of a liquid crystal panel and an assembly of other parts. Thus other shapes thereof will be omitted for clarity purpose. Further, in the small-sized liquid crystal display device of FIG. 2, an upper cover is removed, but may be assembled if necessary.

As shown in FIG. 2, a plurality of LEDs 34 are disposed at a side surface of a light guiding plate 35 to face a light incident surface of the light guiding plate 35. Here, the plurality of LEDs 34 are mounted on the LED substrate 32. In the large-sized liquid crystal display device as shown in FIG. 1, the LED substrate 32 is disposed between the light guiding plate 35 and the guide panel 42 so that a mounting surface of the LED substrate 32 is in contact with the lower cover 40 or the guide panel 42. On the contrary, in the small-sized liquid crystal display device as shown in FIG. 2, the LED substrate 32 is disposed on an upper surface of the light guiding plate 35 and the guide panel 42 so that a mounting surface of the LED substrate 32 faces a lower direction and only the LED 34 is disposed between the light guiding plate 35 and the guide panel 42.

The reason why the LED substrate 32 is disposed on an upper surface of the light guiding plate 35 and the guide panel 42 is in order to minimize a size of the liquid crystal display device. Since such a small-sized liquid crystal display device is mainly used in communication devices, it is required to minimize a size and a weight of the device. Thus, the liquid crystal display device is manufactured in such a manner shown in FIG. 2 in order to minimize a size of the liquid crystal display device, compared with a large-sized liquid crystal display device.

Accordingly, in a large-sized liquid crystal display device shown in FIG. 1, since a rear surface of the LED substrate 32 having a relatively large area contacts the lower cover 40 or the guide panel 42, in a case where heat is generated from the LED 32, the heat is conducted to the lower cover 40 or the guide panel 42 through the LED substrate 32 to thus be emitted outside. On the contrary, in the small-sized liquid crystal display device shown in FIG. 2, since part of a mounting surface of the LED substrate 32 contacts an upper surface of the guide panel 42, heat discharge efficiency is decreased.

Moreover, in a large-sized liquid crystal display device shown in FIG. 1, the LED substrate 32 including a metal is used, whereas in a small-sized liquid crystal display device shown in FIG. 2, since the LEDs 34 are directly mounted on an FPC which has low heat conduction efficiency, heat generated from the LEDs 34 cannot be substantially discharged to outside through the FPC and the guide panel 42. This may cause a problem of temperature rise in the LED 34 of the small-sized liquid crystal display device cannot be prevented.

SUMMARY OF THE INVENTION

Accordingly, the present invention is directed to a liquid crystal display device that substantially obviates one or more of the problems due to limitations and disadvantages of the related art.

An object of the present invention is to provide a display device in which a heat radiation sheet is provided to smoothly discharge heat.

Another object of the present invention is to prevent temperature rise in a liquid crystal display device.

Another object of the present invention is to efficiently discharge heat generated from LEDs in a liquid crystal display device.

Additional features and advantage of the invention will be set forth in the description which follows, and in part will be apparent from the description, or may be learned by practice of the invention. the objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a display device includes a liquid crystal display (LCD) panel; a light emitting diode (LED) substrate having a plurality of LEDs thereon; a light guiding plate below the LCD panel to guide light from the LEDs to the LCD panel; and a heat radiation sheet below the light guiding plate and the LED substrate to discharge heat generated from the LEDs.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Figure 3:
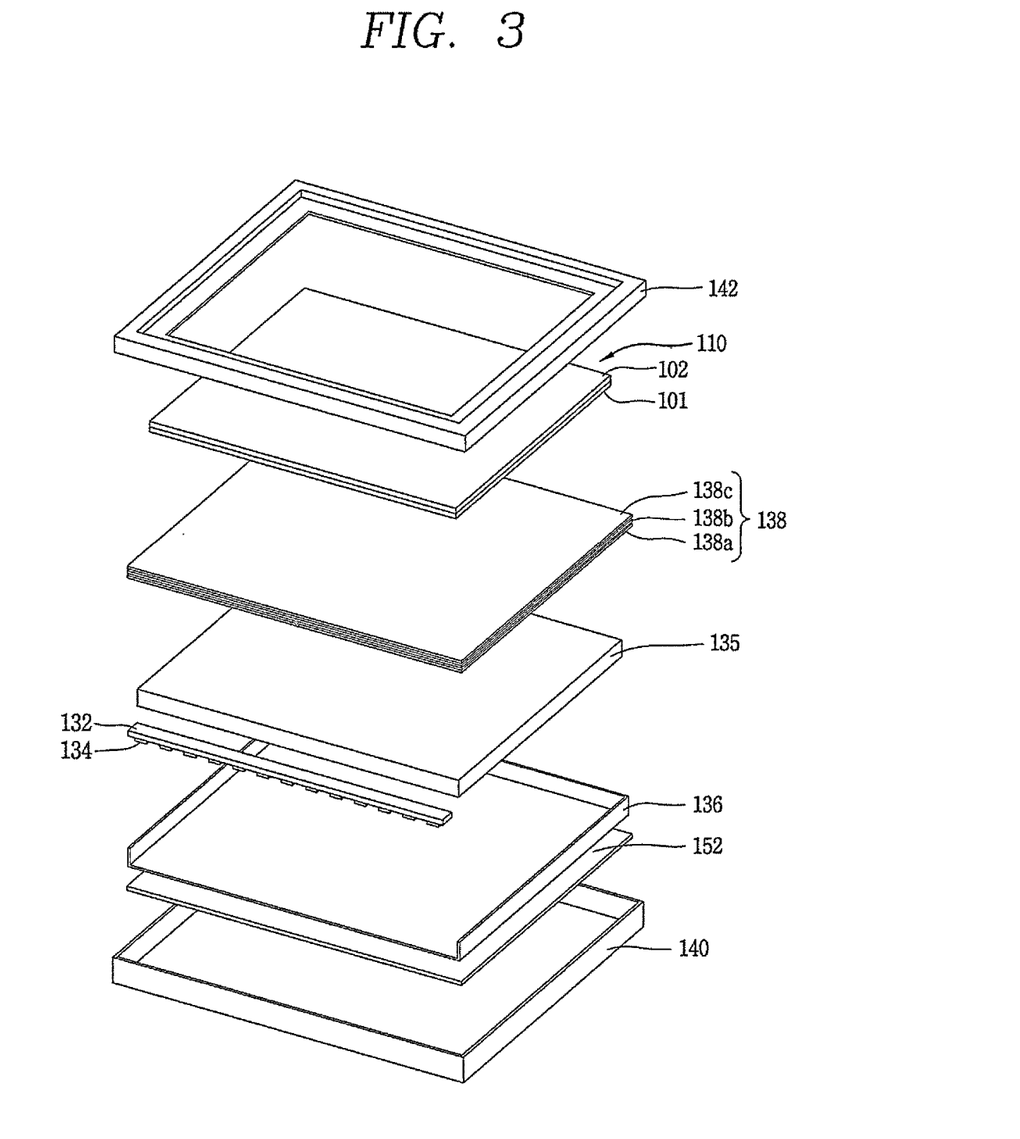
FIG. 3 is a disassembled perspective view illustrating a structure of an LCD according to an example embodiment of the present disclosure.
Figure 4:
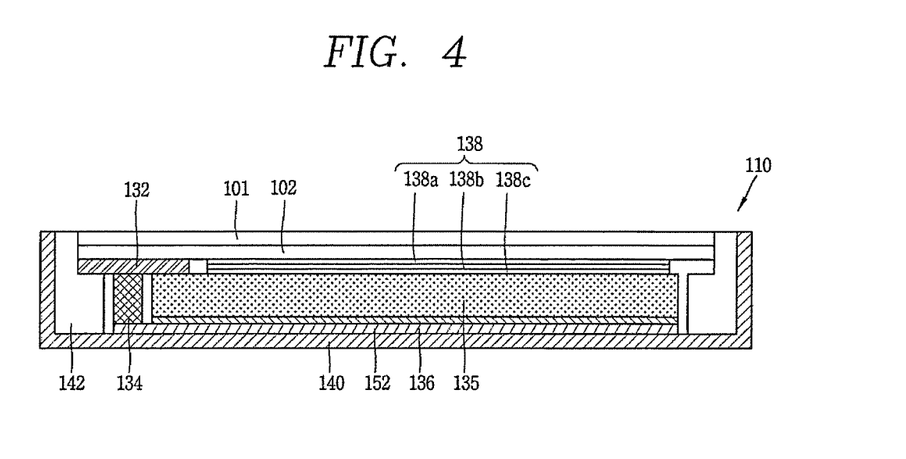
FIG. 4 is a cross-sectional view illustrating a structure of an LCD according to an example embodiment of the present disclosure.

FIG. 3 is a disassembled perspective view illustrating a structure of an LCD device according to an example embodiment of the present disclosure, and FIG. 4 is a cross-sectional view illustrating a structure of an assembled LCD device according to an example embodiment of the present disclosure.

As illustrated in FIGS. 3 and 4, an LCD device includes a liquid crystal panel 110 and a backlight. The liquid crystal panel 110 includes a first substrate 101, a second substrate 102, and a liquid crystal layer (not shown) formed therebetween, and is configured to implement an image upon receipt of an external signal.

The backlight may include a plurality of light emitting diodes (LEDs) 134 disposed at a lower side portion of the liquid crystal panel 110 and configured to emit light, a light guiding plate 135 disposed below the liquid crystal panel 110 and configured to guide light emitted from the LEDs 134 and provide the light to the liquid crystal panel 110, an optical sheet 138 including a diffusion sheet 138a and prism sheets 138b and 138c which are disposed between the liquid crystal panel 110 and the light guiding plate 135 and configured to diffuse and condense light which is guided by the light guiding plate 135 and provided to the liquid crystal panel 110, a reflective plate 136 disposed below the light guiding plate 135 and configured to reflect light guided to a lower side of the light guiding plate 135, and a heat radiation sheet 152 disposed on the reflective plate 136 and configured to discharge heat generated from the LEDs 134.

Here, in the drawings, although the LEDs 134 are disposed at one side of the light guiding plate 135 and light is guided by a light-incident surface at one side thereof to the liquid crystal panel 110, but the LEDs 134 may be disposed at both sides of the light guiding plate 135 so that light can be guided through two light-incident surfaces to the liquid crystal panel 110.

The reflective plate 136, the light guiding plate 135, and the optical sheet 138 of the backlight are accommodated in the lower cover 140 and then assembled by coupling the lower cover 140 and the guide panel 142 with each other.

The liquid crystal panel 110 is positioned on an upper surface of the guide panel 142. The guide panel 142 is formed in a rectangular shape and an edge region of the liquid crystal panel 110 is positioned on the guide panel 142 so that the liquid crystal panel 110 and the backlight can be assembled with each other, thereby completing manufacture of a liquid crystal display device.

Although not shown in the drawings a coupling member for coupling with the lower cover 140 and the guide panel 142 on an upper surface of the liquid crystal panel 110, the upper cover may be disposed at an upper edge region of the liquid crystal panel 110 so as to be coupled with the lower cover 140 and the guide panel 142, thereby resulting in assembling of the liquid crystal panel 110 and the backlight.

Although not shown, a plurality of gate lines and a plurality of data lines are formed on a first substrate 101 in horizontal and vertical directions to define a plurality of pixel regions. A thin film transistor (TFT), a switching element, is formed in each pixel region, and a pixel electrode is formed on the pixel region. The TFT includes a gate electrode connected to a gate line, a semiconductor layer stacked on the gate electrode and formed of an amorphous silicon, and source and drain electrodes formed on the semiconductor layer and connected to a data line and the pixel electrode.

A second substrate 102 includes color filters composed of a plurality of sub-color filters implementing red, green, and blue colors and black matrices demarcating the sub-color filters from each other and blocking light transmitted through a liquid crystal layer.

The first substrate 101 and the second substrate 102 configured as described above are attached by a sealant (not shown) formed in an outer region of an image display region in a facing manner to constitute a liquid crystal panel, and the attachment of the first substrate 101 and the second substrate 102 is accomplished by an attachment key (not shown) formed either on the first substrate 101 or the second substrate 102.

Although not shown, a first polarization plate and a second polarization plate are attached to the first substrate 101 and the second substrate 102, respectively, to polarize light input and output to the liquid crystal panel 110 to implement an image.

The light guiding plate 135 is configured to guide light which is input from the LEDs 134 to the liquid crystal panel 135 in which light incident to one side surface of the light guiding plate 135 is transmitted to other side surfaces after being reflected by upper and lower surfaces thereof, and then outputted to outside. Here, the light guiding plate 135 is formed in a rectangular parallelepiped shape and may include, at its lower surface, patterns or grooves to diffract incident light.

The optical sheet 138 is configured to enhance efficiency of light which is output from the light guiding plate 135 and supply the light to the liquid crystal panel 110. The optical sheet 138 includes a diffraction sheet 138a configured to diffract light output from the light guiding plate 135, and a first prism sheet 138b and a second prism sheet 138c configured to condense the light diffracted by the diffraction sheet 138a to supply uniform light to the liquid crystal panel 110. Here, the diffraction sheet 138a is prepared as a single sheet, but the prism sheet is prepared as a first prism sheet 138b and a second prism sheet 138c both of which are crossed to each other in directions of X and Y axes so that light may be refracted in the directions of X and Y axes, thereby enhancing a straight-propagating property of light.

As the LEDs 134, red (R), green (G), and blue (B) LEDs each emitting monochromatic light or LEDs emitting white light may be used.

In a case where an LED emitting monochromatic light is used, monochromatic light LEDs of R, G, and B are alternatively disposed at predetermined intervals so that the monochromatic light emitted from the LEDs are mixed with the white light and then supplied to the liquid crystal panel 110, while in a case where an LED emitting white light is used, a plurality of LEDs are disposed at predetermined intervals so that white light is provided to the liquid crystal panel.

Here, the white light LEDs include the blue LED which emits blue light and the fluorescent substance which absorbs blue monochromatic light and then emits yellow light, so that the blue monochromatic light which is output from the blue LED and the yellow monochromatic light which is emitted from the fluorescent substance are mixed with each other and then supplied to the liquid crystal panel 110 as white light. In the drawings, the LEDs are disposed at a side surface of the light guiding panel 135, but may be disposed at both sides of the light guiding plate 135.

The LEDs 134 are mounted on a LED substrate 132 which includes a flexible film. The LED substrate 132 is configured in such a manner that a mounting surface where the LEDs are mounted faces a lower side, and is positioned on a partial region of the light guiding plate 135 and the guide panel 142. The LEDs 134 are located in a space between the light guiding plate 135 and the guide panel 142 and provide light to an incident surface of the light guiding plate 135.

Although not shown, the LED substrate 132 is connected to an external driving circuit to supply a signal and power to an LED controller, thereby driving the LEDs 134 by the input signal. Here, the LED substrate 134 including a flexible film includes a flexible circuit board attached thereto which is connected to an external driving circuit. A signal wiring is formed on an upper and/or a lower surface of the flexible circuit board so that a signal from the driving circuit can be input to the LED substrate 132 through the signal wiring.

The reflective plate 136, disposed below the light guiding plate 135, is configured to reflect light which is incident from the LEDs 134 and propagates toward a lower portion of the light guiding plate 135, and provides the light to the liquid crystal panel 110. The reflective plate 136 is formed to have a similar shape to a lower surface of the light guiding plate 135 and reflects all light reflected from the lower surface of the light guiding plate 135. Further, as shown in FIG. 3, the reflective plate 136 may be configured to extend to three side surfaces except a side surface where the LEDs are disposed, to reflective light output from the three side surfaces of the light guiding plate 135. In a case where LEDs 134 are disposed at both sides of the light guiding plate 135, the reflective plate 136 may be extended to both sides of the light guiding plate 135.

Below the reflective plate 136, a heat radiation sheet 152 is disposed. The heat radiation sheet 152 is configured to discharge heat generated from the LEDs 134 to prevent temperature rise in the liquid crystal display device. As shown in the drawings, the heat radiation sheet 152 is formed below a whole surface of the light guiding plate 135 and below the plurality of LEDs 134 to discharge heat.

As a lower cover 140 including metal is disposed below the heat radiation sheet 152 so as to be in contact with the heat radiation sheet 152, heat generated from the LEDs 134 is transmitted to the lower cover 140 through the heat radiation sheet 152 and then discharged outside.

The lower cover 140 includes a bottom surface positioned below the heat radiation sheet 152 and wall surfaces for fixing side surfaces of the light guiding plate 135 and a rear surface of the LED substrate 132, and the reflective layer 136, the light guiding plate 135, the optical sheet 138 and the like are accommodated therein so that a backlight can be fabricated. Further, an external driving unit (not shown) is disposed outside the lower cover 140 to apply a signal to the liquid crystal panel 110 and the LEDs 134.

The guide panel 142 is coupled to the lower cover 140 such that its upper surface encloses an edge of the optical sheet 138 of the liquid crystal panel 110 and side surfaces of the lower cover 140. On an upper surface of the guide panel 142, the liquid crystal panel 110 is mounted to be assembled. Although not shown, an upper cover may cover an outer region of the liquid crystal panel 110.

In a small-sized liquid crystal display device configured as above, since the LEDs 134 are mounted on the LED substrate 132 which includes a plastic film having very low heat conductivity, and the LED substrate 132 is positioned on an upper surface of the guide panel 135 and the light guiding plate 135, the LED substrate 132 contacts the guide panel 135 having good heat conductivity at a minimum area. Thus, heat generated from the LEDs 134 can hardly be discharged out through the LED substrate 132.

However, according to an example embodiment of the present disclosure, it is possible to discharge out heat generated from the LEDs 134 by providing a heat radiation sheet 152 below the backlight. Since the heat radiation sheet 152 contacts the lower cover 140 including a metal at a broad area, heat generated from the LEDs 134 can be smoothly discharged out through the lower cover 140.

Although the heat radiation sheet 152 is formed to have a similar shape to the light guiding plate 135 in the drawings, the heat radiation sheet 152 may be determined by various factors such as a shape of arrangement of LEDs 134, a material of the lower cover 140, and the like. The reason why temperature rise in a liquid crystal display device is prevented by discharging heat is because the heat has a side effect on various parts of the liquid crystal display device, or a user may feel unpleasant due to at a temperature rise. Thus, though it is important to entirely lower a temperature of the liquid crystal display device, it is also important not only to remove a local region where a temperature rapidly rises by spreading heat throughout an entire area of the liquid crystal display device, or but to lower the temperature at a region where main parts vulnerable to heat are mounted and a region where a user frequently contacts (for instance, a portion that a user's face contacts during calling). Accordingly, it is possible to control a conduction path of heat generated from the LEDs 134 by designing a shape of the heat radiation sheet 152 as required, thereby obtaining a desired effect.

The heat radiation sheet 152 may include graphite. The graphite is a material which has a stable hexagonal structure obtained by sintering carbon at a high temperature (2,500-3,000° C.) for about two weeks under an air-blocked condition, which exhibits excellent heat conductivity, heat-resistance and corrosion-resistance. In general, the graphite has heat conductivity of 2 times of steel, $1/3$ times of copper, and $2/3$ times of aluminum.

The heat radiation sheet 152 including graphite may be formed as either an adhesion type or a non-adhesion type.

The non-adhesion type graphite heat radiation sheet 152 is disposed between the reflective plate 136 and the lower cover 140 without an adhesive and forcibly pressed therebetween by a mechanical force thus to discharge heat generated from the LEDs 134.

Figure 5:
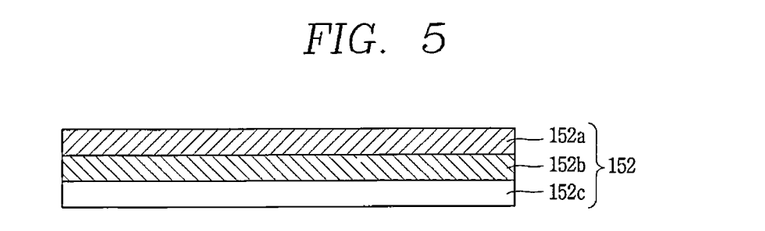
FIG. 5 is a view illustrating a structure of a graphite heat radiation sheet according to an example embodiment of the present disclosure.

As shown in FIG. 5, the adhesion type graphite heat radiation sheet 152 includes a graphite sheet 152a, a heat-resistive adhesive 152b applied to one surface of the graphite sheet 152a, and an anisotropic film 152c attached to the heat-resistive adhesive 152b.

A procedure to attach the heat radiation sheet 152 to the reflective plate 136 and the LEDs 154 will now be described. When the heat radiation sheet 152 is attached to the reflective plate 136 and the LEDs 154 with the heat-resistive adhesive 152b after removing the anisotropic film 152c from the heat radiation sheet 152, the graphite sheet 152a is rigidly attached to the reflective plate 136 and the LEDs 154 without any air gap therebetween by the heat-resistive adhesive 152b so that heat generated from the LEDs 154 can be smoothly discharged through the graphite sheet 152a without a loss due to an air gap, thereby enhancing heat radiation efficiency.

Figure 6:
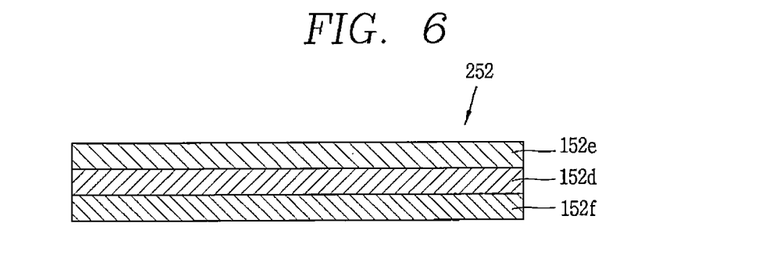
FIG. 6 is a view illustrating a structure of a metal heat radiation sheet according to an example embodiment of the present disclosure.

The heat radiation sheet 152 may include a metal sheet. As shown in FIG. 6, the metal heat radiation sheet 152 includes a copper sheet 152d and first and second stainless steel sheets 152e and 152f formed on upper and lower surfaces of the copper sheet 152d, respectively.

Generally, copper is known as a material having good heat conductivity, but has a difficulty in maintaining its shape due to its ductility. However, in an example embodiment of the present disclosure, since the stainless steel sheets having a good strength are attached to both sides of the copper sheet having good heat conductivity, it is possible to prevent the copper sheet 152d from being bent.

Here, the copper sheet 152d may be formed to have a thickness of 0.03-0.05 mm and the first and second stainless steel sheets 152e and 152f may be formed to have a thickness of 0.02-0.04 mm, respectively. Preferably, the copper sheet 152d is formed to have a thickness of 0.04 mm and the first and second stainless steel sheets 152e and 152f are formed to have a thickness of 0.03 mm, respectively.

Further, although not shown in the drawings, the heat radiation sheet 152 may be composed of the copper sheet 152d, and the stainless steel sheet 152e formed on upper surface thereof, and a lower surface of the copper sheet 152d may be directly attached to the lower cover 140 which includes stainless steel so that a thickness of the heat radiation sheet 152 can be minimized.

Figure 7A:
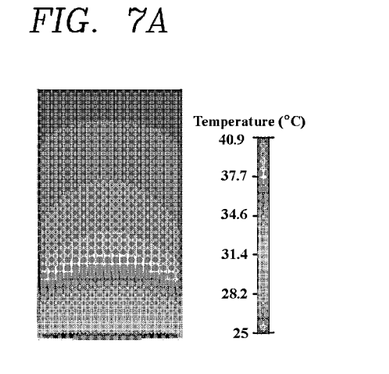
FIG. 7A is a view illustrating heat distribution of a related art liquid crystal display (LCD)
Figure 7B:
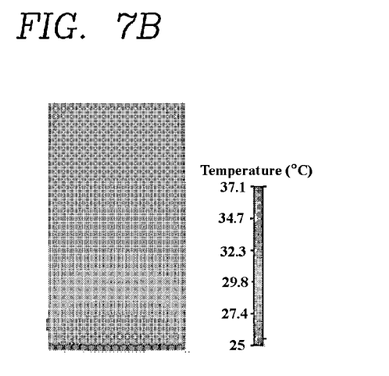
FIG. 7B is a view illustrating heat distribution of a liquid crystal display (LCD) to which a graphite heat radiation sheet is applied according to an example embodiment of the present disclosure.
Figure 7C:
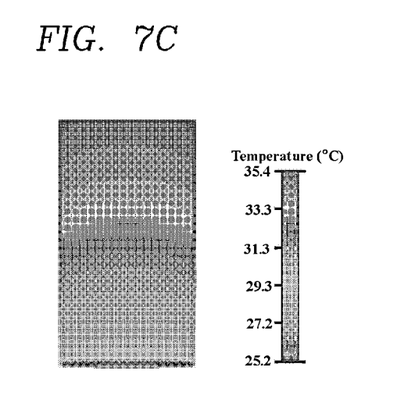
FIG. 7C is a view illustrating heat distribution of a liquid crystal display (LCD) to which a metal heat radiation sheet is applied according to an example embodiment of the present disclosure.

FIGS. 7A, 7B, and 7C are views illustrating heat distributions of a liquid crystal display device measured by a thermographic camera, respectively; in which FIG. 7A illustrates a heat distribution of a related art liquid crystal display device shown in FIG. 2; FIG. 7B illustrates a heat distribution of a liquid crystal display device according to an example embodiment of the present disclosure, to which a graphite sheet is applied as a heat radiation sheet; and FIG. 7C illustrates a heat distribution of a liquid crystal display device according to an example embodiment of the present disclosure, to which a stainless steel sheet is applied as a heat radiation sheet.

First, it can be noted that a region where LEDs are mounted (a lower portion of the LCD device in the drawings) has a highest temperature in all types of liquid crystal display devices and as it becomes distant from the region, temperature becomes lower, as shown in the drawings.

In case of the liquid crystal display device as shown in FIG. 2, the highest temperature at a region where LEDs are mounted was 40.9° C., and as it becomes distant from the region, temperature becomes lower. Further, in case of an LCD device according to an example embodiment of the present disclosure which adopts a graphite heat radiation sheet, a highest temperature at a region where LEDs are mounted was 37.05° C., and as it becomes distant from the region, the temperature becomes lower. Thus, in case of a heat radiation sheet adopting a graphite heat radiation sheet, the highest temperature corresponds to 90.5% of that of the related art liquid crystal display device.

Further, in case of an LCD device adopting a metal heat radiation sheet among the LCD devices according to the present disclosure, the highest temperature at a region where LEDs are mounted was 35.4° C., and as it becomes distant from the region, temperature becomes lower. Thus, in case of an LCD device adopting a metal heat radiation sheet, the highest temperature corresponds to 86.6° C. of the related art LCD device.

As described above in detail, it can be noted that it was possible to smoothly discharge heat generated from LEDs by the heat radiation sheet, as the highest temperature was lower than that of the related art.

Meanwhile, in the above description, an example embodiment of the present disclosure is described with a specific structure, but not limited thereto. For instance, in the detailed description, it is described as an example that a small-sized liquid crystal display device, as shown in FIG. 2, the LED substrate includes a flexible film and disposed on an upper surface of the light guiding plate and the guide panel, but not limited thereto and may be applied to a large-sized liquid crystal display device, as shown in FIG. 1. Though, in the large-sized liquid crystal display device, as shown in FIG. 1, the LED substrate includes metal and is in contact with the lower cover and the guide panel so that heat can be smoothly discharged, but it will be possible to much more enhance the heat radiation efficiency by providing a heat radiation sheet on a lower surface of the reflective plate and the LED substrate.

It will be apparent to those skilled in the art that various modifications and variations can be made in the liquid crystal display device of the present invention without departing from the spirit or scope of the invention Thus, it is intended that the present invention cover the modifications and variations of this invention provided they come within the scope of the appended claims and their equivalents.

What is claimed is:
1. A display device, comprising:
a liquid crystal display (LCD) panel;
a light emitting diode (LED) substrate having a plurality of LEDs thereon;
a light guiding plate below the LCD panel to guide light from the LEDs to the LCD panel; and
a heat radiation sheet below the light guiding plate and the LED substrate to discharge heat generated from the LEDs,
wherein the heat radiation sheet includes metal; and
wherein the heat radiation sheet includes a copper sheet, and first and second stainless steel sheets respectively attached to upper and lower surfaces of the copper sheet.
2. The display device of claim 1, further comprising:
a guide panel for supporting the LCD panel, the light guiding plate, and the LED substrate; and
a lower cover coupled with the guide panel.
3. The display device of claim 2, wherein a mounting surface of the LED substrate with the LEDs mounted thereon is located on a partial region of the light guiding plate and the guide panel, and the LEDs are disposed between the light guiding plate and the guide panel.
4. The display device of claim 3, wherein the LED substrate includes a plastic film.
5. The display device of claim 1, wherein the heat radiation sheet includes graphite.
6. The display device of claim 1, wherein the heat radiation sheet includes a graphite sheet of graphite and a heat-resistive adhesive on the graphite sheet.
7. The display device of claim 1, wherein a thickness of the copper sheet is approximately 0.03-0.05 mm, and a thickness of the first and second stainless steel sheets is approximately 0.02-0.04 mm.
8. The display device of claim 1, further comprising:
a guide panel for supporting the LCD panel, the light guiding plate, and the LED substrate; and
a lower cover coupled with the guide panel,
wherein the second stainless steel sheet directly contacts the lower cover.
9. The display device of claim 1, further comprising:
a guide panel for supporting the LCD panel, the light guiding plate, and the LED substrate; and
a lower cover coupled with the guide panel,
wherein a shape of the heat radiation sheet is determined by an arrangement structure of the LEDs, an area of the liquid crystal panel, and a material and thickness of the lower cover.
10. The display device of claim 1, wherein a shape of the heat radiation sheet is determined by a region where parts vulnerable to heat are mounted, or a region where a user frequently contacts.

11. A display device, comprising:
a liquid crystal display (LCD) panel;
a light emitting diode (LED) substrate having a plurality of LEDs thereon;
a light guiding plate below the LCD panel to guide light from the LEDs to the LCD panel;
a guide panel for supporting the LCD panel, the light guiding plate, and the LED substrate
a lower cover coupled with the guide panel; and
a heat radiation sheet below the light guiding plate and the LED substrate to discharge heat generated from the LEDs,
wherein the heat radiation sheet includes metal; and
wherein the heat radiation sheet includes:
  a copper sheet; and
  a first stainless steel sheet attached to the copper sheet, wherein the copper sheet directly contacts the lower cover.

12. The display device of claim 11, wherein a mounting surface of the LED substrate with the LEDs mounted thereon is located on a partial region of the light guiding plate and the guide panel, and the LEDs are disposed between the light guiding plate and the guide panel.

13. The display device of claim 12, wherein the LED substrate includes a plastic film.

14. The display device of claim 11, wherein the heat radiation sheet includes graphite.

15. The display device of claim 11, wherein the heat radiation sheet includes a graphite sheet of graphite and a heat-resistive adhesive on the graphite sheet.

16. The display device of claim 11, wherein the heat radiation sheet includes a second stainless steel sheet,
wherein the first stainless steel sheet and the second stainless steel sheet are respectively attached to upper and lower surfaces of the copper sheet.

17. The display device of claim 16, wherein a thickness of the copper sheet is approximately 0.03-0.05 mm, and a thickness of the first and second stainless steel sheets is approximately 0.02-0.04 mm.

18. The display device of claim 11, wherein a shape of the heat radiation sheet is determined by an arrangement structure of the LEDs, an area of the liquid crystal panel, and a material and thickness of the lower cover.

19. The display device of claim 11, wherein a shape of the heat radiation sheet is determined by a region where parts vulnerable to heat are mounted, or a region where a user frequently contacts.

\* \* \* \* \*